(No Model.)

J. C. DAVIS.
FLEXIBLE PIPE COUPLING.

No. 592,647. Patented Oct. 26, 1897.

Witnesses
W. F. Doyle.
Edmund H. Krause.

Inventor
John C. Davis
By H. B. Willson.
Attorney

THE NORRIS PETERS CO., PHOTO-LITHO., WASHINGTON, D. C.

UNITED STATES PATENT OFFICE.

JOHN C. DAVIS, OF SENECA FALLS, NEW YORK.

FLEXIBLE PIPE-COUPLING.

SPECIFICATION forming part of Letters Patent No. 592,647, dated October 26, 1897.

Application filed November 28, 1896. Serial No. 613,800. (No model.)

*To all whom it may concern:*

Be it known that I, JOHN C. DAVIS, a citizen of the United States, residing at Seneca Falls, in the county of Seneca and State of New York, have invented certain new and useful Improvements in Flexible Pipe-Couplings; and I do declare the following to be a full, clear, and exact description of the invention, such as will enable others skilled in the art to which it appertains to make and use the same.

My invention has relation to improvements in sanitary closet connections and flexible elbow-pipe joints; and the object is to provide a simple, cheap, and convenient device of this class that can be adjustably secured to a bowl to form an effective connection between its spud and the flush-pipe.

To these ends the novelty consists in the construction, combination, and arrangement of the same, as will be hereinafter more fully described, and particularly pointed out in the claim.

In the accompanying drawings the same figures of reference indicate the same parts of the invention.

Figure 1:
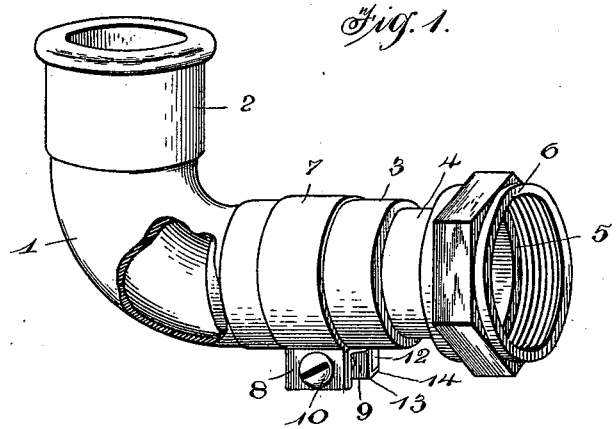
Figure 3:
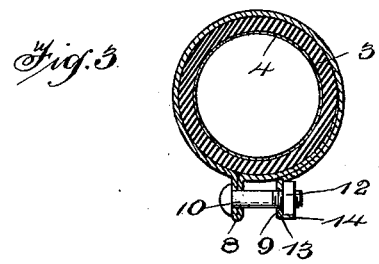
Figure 2:
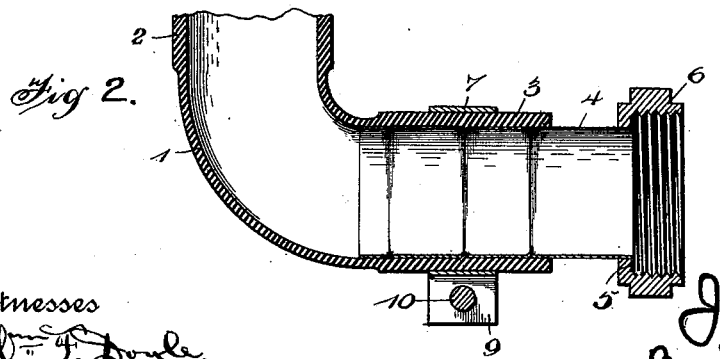

Figure 1 is a perspective view of an elbow connection embodying my invention with a portion of the elbow broken away to show the inner end of the adjusting-sleeve. Fig. 2 is a longitudinal sectional view of the same, and Fig. 3 is a cross-sectional view.

1 represents a flexible rubber elbow having a reinforced end 2 to receive the flush-pipe, vent-pipe, or other connection, its opposite end terminating in a reinforced cylindrical tube 3, which receives the cylindrical metal sleeve 4, the outer end of which is formed with an integral right-angular spun flange 5, which engages the usual collar on the internally-threaded coupling-nut 6, by means of which connection is made in the usual way with the spud or other connection.

7 represents a sheet-metal clamp having perforated integral parallel ears 8 9 to receive the bolt 10 and rectangular nut 12, the outer edge of the ear 9 being turned transversely, forming a lip 14 to hold the nut and prevent its rotation while the bolt is being manipulated.

The outer end of the ear 8 is bent back upon itself and thence circumferentially to form the integral tongue, the free end of which is inserted under the opposite contiguous end of the clamp to bridge the space between the ears and form a continuous bearing around the tube 3, thus making a practically air and water tight joint between the metal sleeve 4 and the tube 3.

By referring to the drawings it will be seen that the sleeve 4 can be withdrawn or forced farther in the end of the tube 3, and by means of the clamp 7 a perfect joint can be made at any point. This construction also permits of a wide range of adjustment in making the connection, and should the rubber become defective or worn it can readily be replaced by simply removing the clamp and inserting a new one without breaking the joint at the coupling-nut 6.

In the modification in Fig. 2 I have shown the metal sleeve 4 formed with a series of annular grooves arranged at certain regular predetermined distances, and the reinforced tube 3 with a single internal annular ring which is adapted to engage any one of the grooves in the sleeve according as the coupling-sleeve is adjusted in or out of the elbow. When the clamp is placed on the tube over its annular ring and tightened, the ring is forced into the groove in such an intimate manner as to make an absolutely air-tight joint between the elbow and the coupling-tube.

By making the sleeve 4 of thin drawn sheet-metal tubing and spinning or flaring the flange 5 direct on the end of the tube a very strong, cheap, and durable connection is made, being far less costly than the cast-metal sleeves usually employed, the flange of which must be turned afterward to form a true joint. This operation is necessarily expensive, and as the walls of the cast sleeve are from an eighth to a quarter of an inch thick it reduces the diameter of the coupling just double that amount, whereas the thin drawn tube is of practically the same diameter as the end of the sleeve.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A closet connection, comprising the flexible reinforced tube 3, having an internal annular ring, in combination with the drawn sheet-metal sleeve 4 having a series of parallel annular grooves and a spun flange 5, and the clamp 7, substantially as and for the purpose set forth.

In testimony whereof I hereunto affix my signature in presence of two witnesses.

JOHN C. DAVIS.

Witnesses:
ARTHUR J. HENDRICKS,
FRANK E. TEN EYCK.